United States Patent [19]

Lobo et al.

[11] Patent Number: 4,897,761
[45] Date of Patent: Jan. 30, 1990

[54] METALLIZED FILM CAPACITOR

[75] Inventors: Edward M. Lobo, Shelton; Michael F. Berman, Ansonia, both of Conn.

[73] Assignee: Magnetek Universal Mfg. Corp., Paterson, N.J.

[21] Appl. No.: 192,374

[22] Filed: May 10, 1988

[51] Int. Cl.[4] .......................... H01B 3/22; H01B 3/20
[52] U.S. Cl. ...................................... 361/311; 252/579
[58] Field of Search ............... 29/25.42; 252/567, 570, 252/574, 578, 579, 581; 361/311–319, 323, 272, 273

[56] References Cited

U.S. PATENT DOCUMENTS

| | | | |
|---|---|---|---|
| 3,214,657 | 10/1965 | Davis | 361/273 |
| 3,754,173 | 8/1973 | Eustance | 361/319 |
| 3,833,978 | 9/1974 | Eustance | 29/25.42 |
| 4,276,184 | 6/1981 | Mandelcorn et al. | 252/579 |
| 4,317,158 | 2/1982 | Dequasie | 361/272 |
| 4,317,159 | 2/1982 | Dequasie | 361/318 |
| 4,327,395 | 4/1982 | Yagitani et al. | 361/314 X |
| 4,422,962 | 12/1983 | Cichanowski | 252/578 |
| 4,476,516 | 10/1984 | Shedigian | 361/315 |
| 4,536,331 | 8/1985 | Shedigian | 252/579 |
| 4,538,208 | 8/1985 | Shedigian | 361/319 |
| 4,542,731 | 2/1987 | Shedigian | 361/319 |
| 4,580,189 | 4/1986 | Dequasie et al. | 361/272 |

OTHER PUBLICATIONS

"On the Prevention of the Capacitance Loss of MPP Capacitors," Nishiki Research Laboratory, Kureha Chemical Industry Co., Ltd., 1986.

Primary Examiner—Donald A. Griffin
Attorney, Agent, or Firm—Darby & Darby

[57] ABSTRACT

A metallized film capacitor includes an aromatic ester dielectric fluid including 2.0–5.0% by weight of an epoxide in an aromatic ester such as dioctyl phthalate. Utilizing such a particular amount of epoxide results in a substantial performance improvement under high temperature and voltage conditions, providing a metallized film capacitor of reduced size and cost.

9 Claims, 1 Drawing Sheet

METALLIZED FILM CAPACITOR

TECHNICAL FIELD

This invention relates to epoxide stabilized liquid ester containing metallized film capacitors.

BACKGROUND

Generally, metallized film capacitors comprise two tightly wound sheets, wrapped around a core, with each sheet including a metallized layer on one side, with the metallization absent from two oppositely disposed margin layers. The opposite ends of the rolled capacitor are sprayed with a conductive metal which bonds with the sheet having a metallized end, with leads attached to form the capacitor electrodes. The rolled capacitor is then disposed in a housing and impregnated with a dielectric fluid. Metallized film capacitors differ in the degree of impregnation from paper capacitors because of the tightness of the winding and the lack of porosity of the film, with some impregnation occurring through the wound ends. While metallized film capacitors are preferred due to their less labor intensive assembly, they have limited usefulness at higher voltages due to metal degradation.

Aliphatic or aromatic esters have been disclosed for use as dielectric capacitor impregnants, with the aromatic esters preferred in many applications. However, the aromatic esters have the disadvantage of exhibiting a high power factor at elevated temperatures, and suffer from degradation through hydrolysis. Various attempts have been made to overcome these disadvantages. In U.S. Pat. No. 3,754,173 to Eustanoe, an epoxide stabilized liquid aromatic ester is disclosed for use as an electrical capacitor impregnant in a paper or soggy foil capacitor, with the preferred ester being di(2-ethylhexyl) phthalate or DOP. The epoxide stabilizer increases the high temperature life of the capacitor by interacting with those chemical compounds ordinarily found in or generated during operation of the electrical capacitors, preventing these compounds from degrading the DOP. Eustance states that those epoxides of high molecular weight are preferred in greater amounts than those epoxides of lower molecular weight, with generally amounts between about 0.1% by weight up to about 10% being satisfactory. In the three examples, Eustance uses 1.0% by weight of diglycidyl ether of bisphenol A to stabilize the DOP in a paper capacitor.

While Eustance teaches 0.1–10% generally for paper and soggy foil capacitors, common practice in the industry is to use between 0.5 and 1% by weight of an epoxide in paper capacitors with complete impregnation. While useful in impregnatable capacitors, these aromatic ester dielectrics, even with epoxide stabilizers, have not proved useful in metallized film capacitors, which cannot be totally impregnated. For such capacitors, most efforts are shifting to other dielectric compositions including propylene glycol (U.S. Pat. No. 4,422,962 to Cichanowski), isocyanates (U.S. Pat. No. 4,317,159 to DeQuasie), or glyceryl triacetate with 30 to 90% volume epoxidized soybean oil (U.S. Pat. No. 4,642,731 to Shedigian).

However, the search continues for high performance dielectric fluids for use with metallized film capacitors which allows their utilization at higher voltages than previously achieved, providing enhanced performance, stability, and life.

SUMMARY OF INVENTION

According to the present invention, a metallized film capacitor includes an epoxide stabilized aromatic ester dielectric fluid, the dielectric fluid consisting essentially of 2.0–5.0% by weight of an epoxide with the balance aromatic ester.

Utilizing 2.0–5.0% epoxide in, for example, DOP provides such a significant increase in metallized film capacitor performance over the results achieved by the prior art that one skilled in the art would find the results quite surprising. Consequently, the disclosure of this invention advances the art of metallized film capacitors by allowing their use in higher voltage applications.

DESCRIPTION OF THE INVENTION

Figure 1:
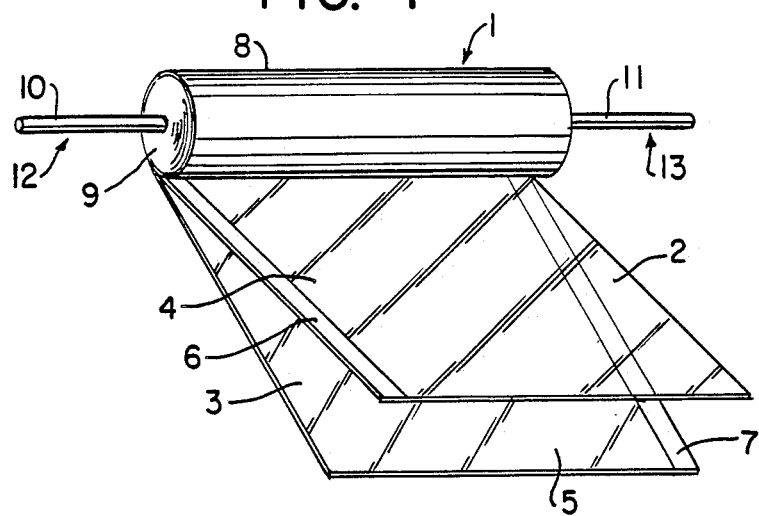
FIG. 1 is a sectional view of a metallized polypropylene capacitor, partially unwound.

Referring to FIG. 1, a metallized film capacitor 1 is shown. Metallized film capacitors are more sensitive to the presence of impurities than impregnatable capacitors, as impurities such as water vapor may react with the metallization, converting the metal to an oxide which is an insulator, resulting in extensive capacitance loss. While the preferred metallization is aluminum, other metallization known in the art, such as copper, zinc or alloys thereof, may be used. The preferred film is polypropylene, but mylar or polycarbonate dielectric films may also be used.

Referring still to FIG. 1, the capacitor 1 is composed of two sheets of polypropylene, 2 and 3 respectively, each sheet having a metallized layer, 4 and 5, on one side thereof. The metallized layers are separated by the unmetallized side of each film. Each sheet includes an unmetallized margin, 6 and 7, which are oppositely positioned during winding of the sheets around a core (not shown), forming a wound section 8. The metallized end of each sheet is therefore available for lead contact at only one edge of the winding. After tightly winding the sheets around the core, the ends of the wound section 8 are covered with a conductive metallic spray 9, and leads 10 and 11 are connected thereto to form electrodes 12 and 13, respectively.

The wound section 8 is then surrounded with the dielectric fluid of the present invention, preferably using vacuum impregnation methods known within the capacitor art. While impregnation is attempted, it is not believed that total impregnation is achieved, due to the tightness of the winding and the lack of permeability of the film. However, the fluid may infiltrate the end windings to some degree.

Capacitance retention and high temperature life characteristics of metallized film capacitors have been found to be improved through the use of a dielectric fluid containing 2.0–5.0% by weight epoxide with the balance being an aromatic ester such as DOP. Below 2%, there is rapid degradation, while above 5.0%, performance degradation also occurs. The reasons for this are unknown, however, it is believed that impurities are optimally scavenged at the critical terminal ends with the proper amount of epoxide present, reducing degradation of the metallization and increasing capacitor life.

The dielectric fluid of the present invention therefore consists essentially of 2.0–5.0% by weight of an epoxide such as cycloaliphatic epoxide (Union Carbide ERL 4221) or diglyceride ether of bisphenol-A (Dow epoxy resin number 330, a product of Dow Chemical Co.). While such epoxides are exemplary, other epoxides usable with the present invention may be generally characterized by the group:

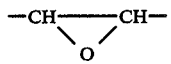

examples of which are glycidyl ethers and derivatives of ethylene oxide. Specific examples of these compounds are 3,4 epoxycyclo- hexylmethyl-3 4 epoxycyclohexane carboxylate, phenoxy oxide (phenol glycidyl ether), glycidyl allyl ether, benzyl ethylene oxide, styrene oxide, 1,3-bis (2,3-epoxy propoxy) benzene, and 4,4-bis (2,3-epoxy propoxy) diphenyldimethylmethane. Mixtures of any two or more of such epoxide compounds may also be employed as desired. While the particular kind of epoxide is not critical, the amount used within the dielectric is. Substantial improvement in performance, as well as life, is only achieved in the critical range of 2–5% by weight.

Various aromatic esters are usable as the dielectric for combination with the epoxide additive. Of these, the preferred ester is di(2-ethyl hexyl) phthalate, better known as dioctyl phthalate (DOP). Also preferred is diisononyl phthalate (DINP). Other dielectric fluids may include dioxyl sebacate (DIOS), diisodekyl phthalate (DIDP), dimethyl phthalate (DMP), and diethyl phthalate (DEP).

The performance enhancement achieved with the epoxide stabilized dielectric composition was demonstrated in life tests at 500 volts and 100° C. for a 10 uf/8u, 400 VAC capacitor. Referring to the Table, data is shown for four sets of metallized film capacitors, with a plot of the results shown in FIG. 2. The dissipation factor, df, illustrates the amount of energy converted to heat.

| Capacitor - Tested at 100° C./500 VAC | Hours | Percent Capacitance Change | Average Df (PPM @ 1 KHZ) |
| --- | --- | --- | --- |
| DOP + 2% Epoxide, Alloy Met. PP | 0000 | 0.0000 | 785.17 |
| | 0388 | 0.8383 | 996.17 |
| | 0559 | 1.3183 | 1104.50 |
| | 0967 | 2.0147 | 1207.33 |
| DOP + 2% Epoxide, Aluminum Met. PP | 0000 | 0.0000 | 634.67 |
| | 0388 | −1.8250 | 734.00 |
| | 0559 | −2.4760 | 1035.00 |
| | 0967 | −4.1198 | 997.00 |
| DOP + 0.5% Epoxide, Alloy Met. PP | 0000 | 0.0000 | 777.17 |
| | 0388 | −16.9152 | 4782.33 |
| DOP + 0.5% Epoxide, Aluminum Met. PP (.5%) | 0000 | 0.0000 | 711.00 |
| | 0388 | −11.0703 | 1730.33 |

Figure 2:
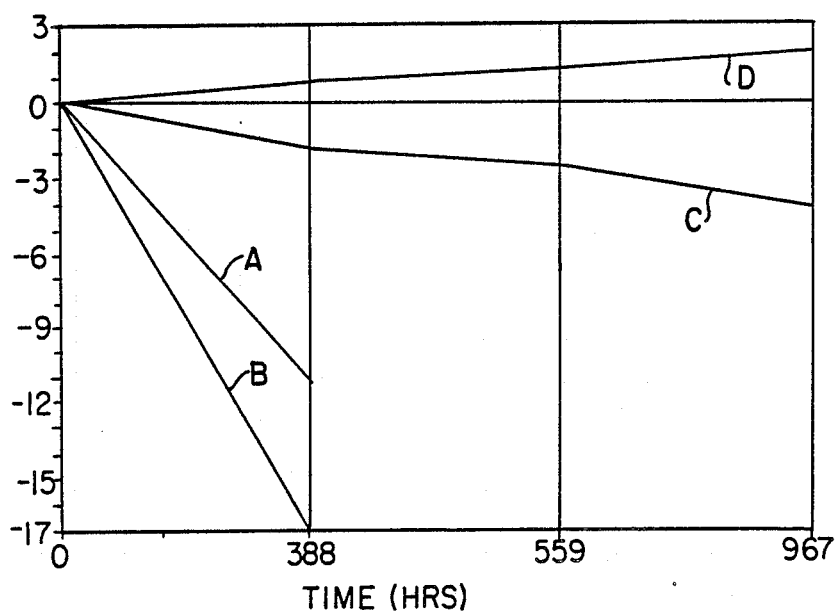
FIG. 2 is a graph illustrating capacitance change versus time for a 10 uf/8u metallized polypropylene capacitor.

Referring to FIG. 2, the capacitance change versus time for the 10 uf/8u metallized polypropylene capacitors are shown. Four sets of capacitors containing DOP with varying amounts of epoxide were tested. One set included DOP with 0.5% epoxy and aluminum metallized polypropylene, represented by Line A on FIG. 2. A second set included 0.5% epoxide with zinc alloy metallized polypropylene, represented by Line B. A third set represents DOP with 2% epoxide in an aluminum metallized polypropylene, represented by Line C, and the fourth set, containing DOP and 2% epoxide with a zinc alloy metallized polypropylene capacitor, is represented by Line D.

As shown in FIG. 2, the capacitors containing 0.5% epoxide experienced capacitance changes of 11 and 17% respectively after 388 hours while the capacitance sets with 2% epoxide stabilizer lost less than 4% after about 1000 hours. The additive thereby improved capacitance retention and life characteristics without adverse effects on other electrical properties, significantly increasing the life beyond that expected in light of the prior disclosure and usage.

The enhanced performance achieved by the present invention results in an increased voltage tolerance of the metallized film. Previously, about 40 volts per micron at 90° C. was the accepted standard for metallized film capacitors. However, using 2.0–5.0% epoxide in an aromatic ester dielectric fluid increases the voltage tolerance to about 50 volts per micron, allowing the use of thinner gauge capacitor materials for a given voltage in a capacitor, resulting in a smaller size and thus lower cost unit. For instance, a 35 uf/280 volt AC capacitor previously required a 8 micron metallized polypropylene film. Utilizing the present dielectric fluid allows the use of a 6 micron metallized polypropylene with a 9% reduction in cost, while providing equivalent performance. In a 10 uf/280 volt AC capacitor, similar design changes have resulted in a 10% reduction in cost. Consequently, utilizing the present invention substantially increases the utility of aromatic ester containing metallized polypropylene capacitors through increased performance while reducing unit cost.

While this invention has been described in relation to an aluminum metallized polypropylene film capacitor, it will be understood by those skilled in the art that this invention may be utilized with any metallized film capacitor which requires increased performance with reduced product cost. It will also be understood by those skilled in the art that various changes can be made to the metallized film capacitor without varying from the scope of the present invention.

Having thus described the invention, what is claimed is:

1. A metallized film capacitor including an aromatic ester dielectric fluid, with the dielectric fluid consisting essentially of:
   2.0–5.0% by weight of an epoxide with the balance aromatic ester, the capacitor being metallized with a material from the group consisting essentially of aluminum, zinc, copper or alloys thereof, the fluid surrounding but not impregnating the capacitor.

2. The metallized film capacitor of claim 1 wherein the capacitor is metallized with aluminum.

3. The metallized film capacitor of claim 1 wherein the capacitor is metallized with zinc.

4. The metallized film capacitor of claim 1 wherein the epoxide is from the group consisting essentially of 3,4 epoxycyclohexylmethyl-3,4 epoxycyclohexane carboxylate, phenoxy oxide (phenyl glycidyl ether), glycidyl allyl ether, benzyl ethylene oxide, styrene oxide, 1,3-bis(2,3-epoxy propoxy) benzene and 4,4-bis(2,3-epoxy propoxy) diphenyldimethylmethane.

5. The metallized film capacitor of claim 1 wherein the aromatic ester is from the group consisting essentially of di( 2-ethylhexyl) phthalate, diisononyl phthalate, dioxyl sebacate, diisodekyl phthalate, dimethyl phthalate, and diethyl phthalate.

6. The metallized film capacitor of claim 1 wherein the epoxide is 3,4-epoxycyclohexylmethyl-3,4-epoxycyclohexane carboxylate.

7. The metallized film capacitor of claim 1 wherein the aromatic ester is di(2-ethylhexyl) phthalate.

8. The metallized film capacitor of claim 1 wherein the film is from the group consisting essentially of polypropylene, polycarbonate and mylar.

9. The metallized film capacitor of claim 1 wherein the film is polypropylene.

* * * * *